(12) United States Patent
Falco (10) Patent No.: US 7,382,774 B2
(45) Date of Patent: Jun. 3, 2008

(54) BANKOVER CONNECTION SYSTEM

(76) Inventor: Anthony R. Falco, 3703 Live Oak Rd., Crystal Lake, IL (US) 60012

( * ) Notice: Subject to any disclaimer, the term of this patent is extended or adjusted under 35 U.S.C. 154(b) by 604 days.

(21) Appl. No.: 11/141,086

(22) Filed: May 31, 2005

(65) Prior Publication Data

US 2006/0270272 A1 Nov. 30, 2006

(51) Int. Cl.
*H04L 12/50* (2006.01)
(52) U.S. Cl. .............. 370/360; 370/386; 439/579; 439/578; 709/250; 379/438
(58) Field of Classification Search ........... 370/360, 370/386; 439/578, 579; 709/250; 379/438
See application file for complete search history.

(56) References Cited

U.S. PATENT DOCUMENTS

| | | | |
|---|---|---|---|
| 4,024,360 A * | 5/1977 | Biraghi et al. ............ 370/200 |
| 4,954,949 A | 9/1990 | Rubin | |
| 5,423,697 A | 6/1995 | MacGregor | |
| 5,477,418 A | 12/1995 | MacGregor et al. | |
| 5,518,416 A | 5/1996 | Kantner et al. | |
| 5,666,491 A | 9/1997 | Harris | |
| 5,944,535 A | 8/1999 | Bullivant | |
| 5,971,813 A | 10/1999 | Kunz | |
| 5,984,731 A | 11/1999 | Laity | |
| 5,999,621 A * | 12/1999 | Martin et al. ............. 379/438 |
| 6,058,432 A | 5/2000 | Shin | |
| 6,215,656 B1 | 4/2001 | O'Neal | |
| 6,358,093 B1 | 3/2002 | Phommachanh | |
| 6,547,602 B2 | 4/2003 | Price et al. | |
| 6,594,707 B1 | 7/2003 | Rubinstein et al. | |
| 6,633,921 B1 | 10/2003 | Pan | |
| 6,660,939 B1 * | 12/2003 | Gunnels ................... 174/75 C |
| 6,747,878 B1 | 6/2004 | Hipp et al. | |
| 2002/0093384 A1 * | 7/2002 | Woods et al. ................. 331/25 |
| 2004/0242081 A1 * | 12/2004 | Otto et al. ................... 439/709 |
| 2005/0032419 A1 | 2/2005 | Kedem | |
| 2006/0034150 A1 * | 2/2006 | Scott ........................... 367/15 |
| 2006/0246776 A1 * | 11/2006 | Itou et al. ................... 439/579 |
| 2006/0274736 A1 * | 12/2006 | Pike et al. ................... 370/360 |
| 2007/0093123 A1 * | 4/2007 | Thomas ...................... 439/498 |
| 2007/0264866 A1 * | 11/2007 | Oesterhaus et al. ......... 439/493 |

* cited by examiner

*Primary Examiner*—Danh C Le
(74) *Attorney, Agent, or Firm*—Meroni & Meroni, P.C.; Charles F. Meroni, Jr.; Christopher J. Scott (57) ABSTRACT

A bankover connector is disclosed for enabling maximized readable signal output from a trunk line comprising a number of grouped trunk line conductors, each line conductor grouping carrying a select readable signal. The bankover connector comprises a trunk line interface, a machine interface means, and a number of bankover conductors at least equal to the number of trunk line conductors. The machine interface comprises a number of machine ports and the bankover conductors extend intermediate the trunk line interface and the machine ports. The machine ports are electrically communicable with a number of signal-reading machines. The select readable signals are thus electrically communicable with the trunk line interface, the bankover conductors, the machine ports, and the signal-reading machines. The bankover connector thus enables maximized readable signal output from the trunk line.

23 Claims, 4 Drawing Sheets

BANKOVER CONNECTION SYSTEM

BACKGROUND OF THE INVENTION

1. Field of the Invention

The present invention generally relates to a connector for maximizing the use of otherwise dormant conductors in communications cable. More particularly, the present invention relates to a so-called "bankover" connection system, which system incorporates a connector, configured to utilize existing, off the shelf hardware, in a more efficient and productive manner, so as to maximize communication gateways for allowing more efficient transmission of electronic data or signals.

2. Description of the Prior Art

Computer operations experts are constantly under pressure from consumers to save time and money when implementing technology. A common scenario in which time and money may be saved, for example, is the installation and running of new computer network cable. Consumers are constantly demanding additional computing power to be added to existing computing networks, which demand often requires the installation and running of new computer network cable. Notably, however, existing computer network cable often comprises dormant portions, which if utilized, could eliminate the need for installing and running additional computer network cable, thereby saving the consumer time and money.

With these notions in mind, it was further noted that one could essentially double usable line capacity without the time and expense of installing new computer networking cable if only there existed a connector that would accommodate the existing cable and make use of dormant wires that were already installed. State of the art connectors and connection systems, however, were inadequate for the stated purpose.

To illustrate the prior art need, consider, for example, any cable having more than four wires within its casing. An example would be Category 5 (CAT5) or Category 6 (CAT6) cable (noting that there are other main trunk lines which have considerably more individual wires than these two types). Consider further that this cable runs between two connection points, with a typical goal of connecting computers. The cable could be located in a home or office. It could be located on one horizontal plane or floor within a building or it could be located in a vertical campus or office high-rise or it could be buried underground.

Also consider a Registered Jack 45 (RJ45) connector which is used to attach two or more computers using cable as described above. However, and within the RJ45 connector, there are only four conductors being used to cause computers to communicate. A so-called bankover connector, which modifies RJ45 connections, can be used at any of these locations to avoid the installation of more cable. So in a home or office or in any location that uses RJ45 connectors, a bankover connector can be used on existing cable to increase its carrying capacity. The bankover connection type saves time and money in any instance where additional computing power is required.

The prior art teaches no connector or connection systems to achieve these results. Notably, there are connectors which split signals from one cable into two cables and there are cross-over type systems, but there are none which effectively combine signals into one cable. Typically, when an installer is adding computing power there is no overt installer concern to save time and expense, the concern often being overlooked and the burden simply being placed on the purchaser or consumer to pay for the added cable and time to increase capacity—because no bankover connector exists.

Within any vertical or horizontal campus, there are points of connectivity that occur. These points represent a location along the wire where termination and/or connection should occur. At these points, a bankover connector can be used if the engineer sees value and reasoning for increasing capacity as described above. Such connection points could be in a tunnel, they could be a wiring closet or they could be along a bay of office cubes. They could be in a home attic or a basement or along the perimeter of a bedroom. They could be within a cable line where a router exists or a splitter exists. It could be at the computer itself or anywhere the "trunk" line exists.

The reader may be tempted to consider that the bankover connection is simply a modified crossover connection. The bankover connection, however, is not a crossover connection. The term "bank" over has been selected because it is a bank of wires, that being a bank of 4 wires, which is crossed over or switched over within the logical architecture of the RJ45 connection. The bankover connection type is intended to keep all wiring capabilities within the limits of an RJ45. This can also be called any of the following but bankover is preferred; a setover, a trunkover, a groupover, a changeover, a switchover, a line exchange, a bank exchange, a set exchange, a set interchange, a bank interchange, a group change, a set change, a cross configuration connection.

It will thus be seen from a review of the prior art generally known to exist that the prior art does not teach a bankover connection system or bankover connector for combining multiple signals into a single trunk line for making more efficient use of otherwise dormant conductors in the trunk line for enabling transmission of electronic date or signal information. The prior art thus perceives a need for a bankover connection system or bankover connector for combining multiple signals into a single trunk line for making more efficient use of otherwise dormant conductors in the trunk line for enabling transmission of electronic date or signal information.

SUMMARY OF THE INVENTION

Accordingly, it is an object of the present invention to provide a simple, low cost connector adapted to make use of existing commonly used off the shelf communications components to make more effective use of existing communications components. It is a further object of the present invention to provide a connector that is easy to install and provides the consumer with a simple, effective means to double computer capacity utilizing existing network components.

To achieve these and other readily apparent objectives, the present invention essentially provides a so-called bankover connector for enabling maximized readable signal output from a trunk line, the trunk line comprising a plurality of trunk line conductors, which trunk line conductors are divided into a number of line conductor groupings. The line conductor groupings comprise at least one primary line conductor grouping and at least one secondary line conductor grouping. Each line conductor grouping carries a select readable signal or distinct electronic transmission.

The bankover connector comprises trunk line interface means, machine interface means, and a number of bankover conductors, the number of bankover conductors being at least equal to number of trunk line conductors. The machine interface means comprise a number of machine ports, the bankover conductors extending intermediate the trunk line interface means and the machine ports. The machine ports are electrically communicable with a number of signal-reading machines. The select readable signals are electrically communicable with the trunk line interface means, the bankover conductors, the machine ports, and the signal-reading machines. The bankover connector thus enables maximized readable signal output from the single trunk line.

Notably, the bankover conductors are divided into a plurality of connector groupings, the connector groupings comprising at least one primary connector grouping and at least one secondary connector grouping. The primary connector grouping is electrically communicable with the primary line conductor grouping and the secondary connector grouping is electrically communicable with the secondary trunk line conductor grouping. Further, the bankover connector is usable in combination with the signal-reading machines, which signal-reading machines comprises port communication means. The port communication means comprise sequential connector conductors (or machine interface conductors), the sequential connector conductors being divided into a number of bank groupings. The number of bank groupings is no greater than the number of machine port pairings. The bank groupings comprise at least one primary bank grouping and at least one secondary bank grouping. The primary bank grouping of a first select signal-reading machine is electrically communicable with the primary line conductor grouping via the primary connector grouping and the primary bank grouping of at least one second select signal-reading machine is electrically communicable with a secondary trunk line conductor grouping via the secondary connector grouping.

Essentially, the bankover connection changes the connection points of a main trunk line. A main trunk line which originally carries one set of electrical impulses is thus converted to allow two sets of impulses to be carried. At either end of the trunk line there exists a bankover connection allowing both sets of impulses to exist. A trunk line as described here, is any set of eight (or possibly more) wires such that when reconfigured at two opposite points of connection, duplicate paths of conductivity are allowed to occur simultaneously, not impacting the flow of either.

An existing connection type called an RJ45 may be required, but the concept extends beyond the limitations of an RJ45 connector. This connector is commonly used to connect two or more computers and allows them to communicate with one another. Further, an existing trunk line or bank of wires containing 8 or more wires, sometimes referred to as CAT5 or CAT6 cabling, may also be required. As long as there is a minimum of 8 wires, the bankover connector of the preferred embodiment (described in more detail hereinafter) will work. Thus, two or more computers, using RJ45 communication connectors, with a main trunk line between the two computers of a cable type containing 8 or more wires, may thus "talk" to each other via the common trunk line.

As noted, it is contemplated that the bankover connection can be applied within the communication wiring techniques between personal computers. However, the bankover connection concept can be applied outside of this environment, as long as the same conditions exist. The communication between computers is limited by current RJ45 connection configurations and the bankover connection doubles the existing trunk line capacity.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows.

DETAILED DESCRIPTION OF THE PREFERRED EMBODIMENT(S)

Figure 1:
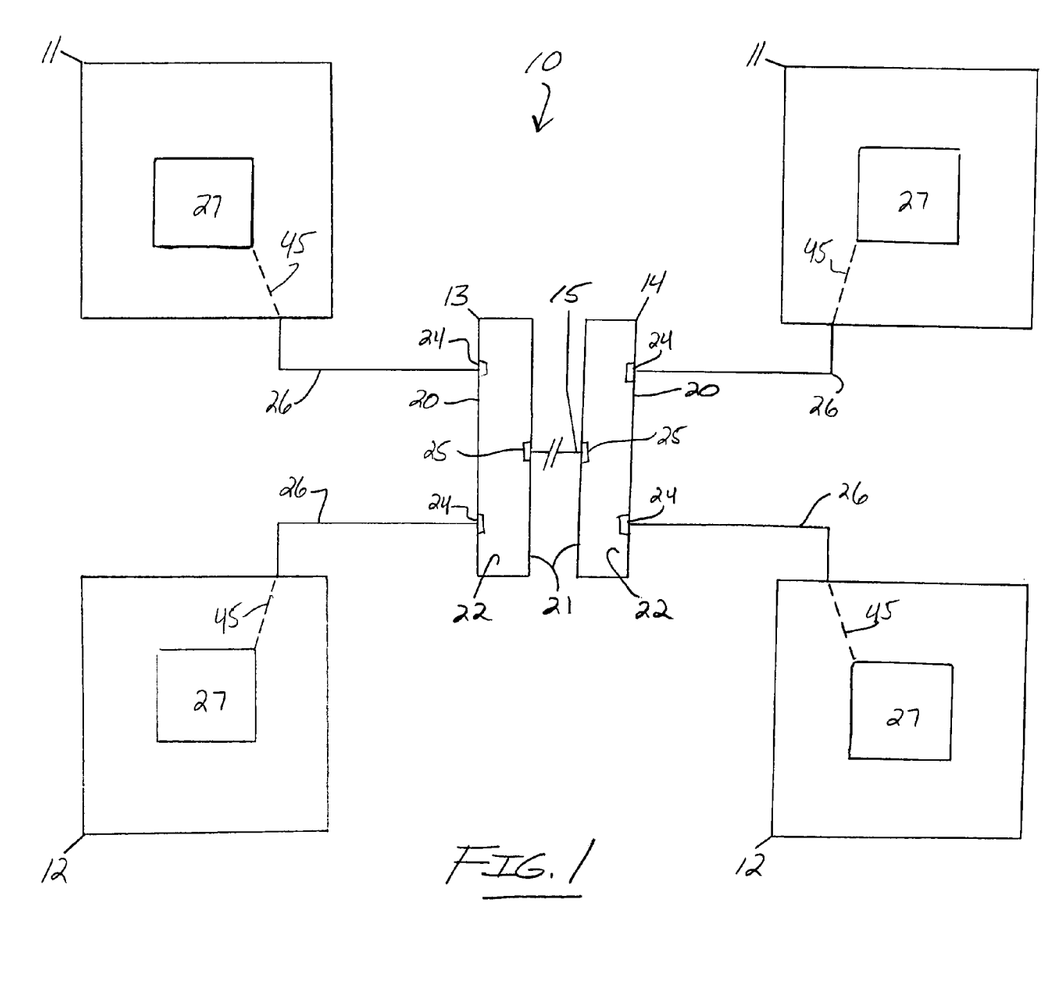
FIG. 1 is diagrammatic depiction of the preferred bankover connection system comprising two sets of paired computers, two bankover connectors, a trunk line and port communication means.

Referring now to the drawings, the preferred embodiment of the present invention concerns a bankover connection system 10 as generally referenced in FIG. 1. Bankover connection system 10 functions to enable at least two paired computer sets to electrically communicate via a single communication line. As has been noted, consumers may realize cost-savings by utilizing a common trunk line to otherwise link at least two sets of computer pairs to one another rather than installing additional trunk lines given that trunk lines often extend over large distances through both horizontal and vertical campuses and further that trunk lines often comprise dormant conductors. Given than common trunk lines comprise conductors that often go unused, the present system contemplates maximizing the use of a trunk line conductor so that multiple sets of computers or other electrical machinery may communicate through a common line.

Figure 2:
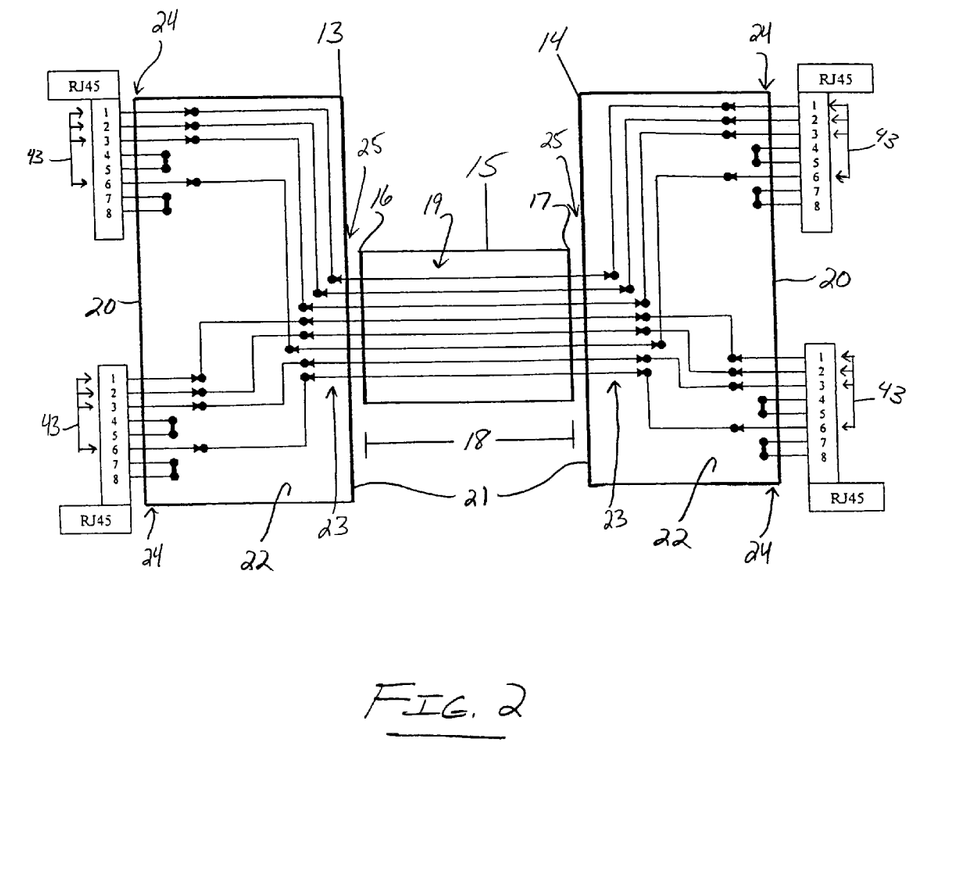
FIG. 2 is a diagrammatic depiction of two bankover connectors, a trunk line, and RJ45 jacks of the port communication means.
Figure 3:
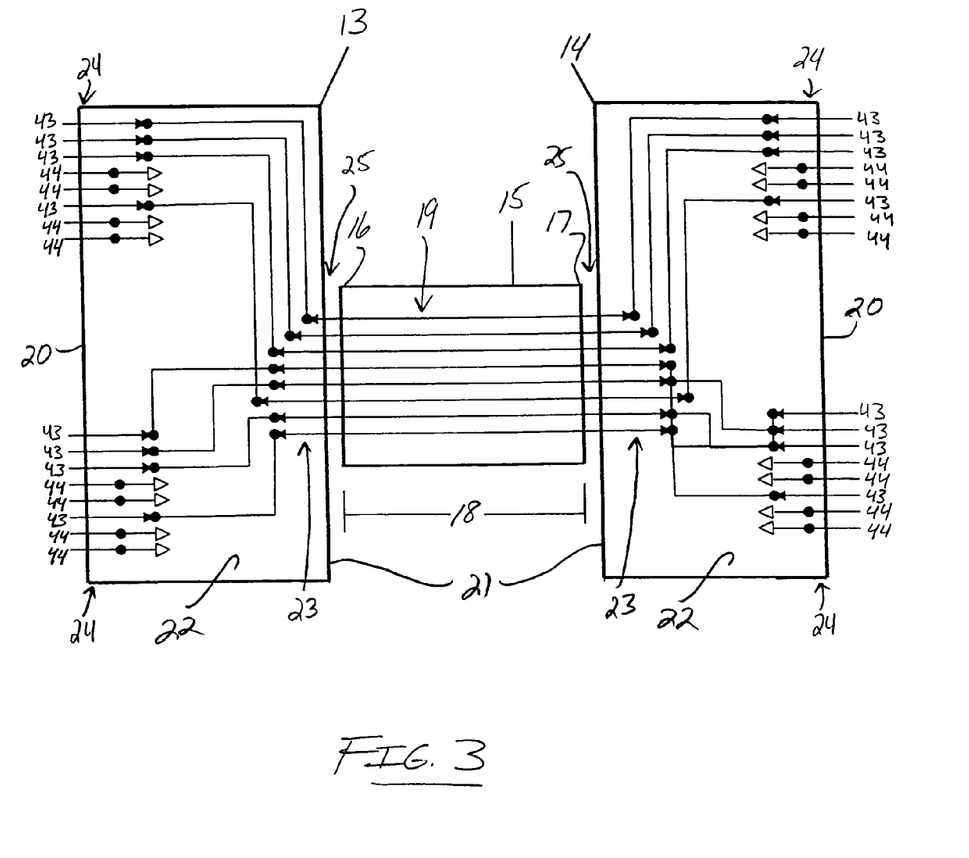
FIG. 3 is a diagrammatic depiction of two bankover connectors, a trunk line, and generic component of the port communication means.

Bankover connection system 10 thus preferably comprises, in combination, a first computer pair as referenced at 11 in FIG. 1 and at least one second computer pair as referenced at 12 in FIG. 1; a first bankover connector 13 as referenced in FIGS. 1-3, and a second bankover connector 14 as referenced in FIGS. 1-3; and a trunk line 15 as referenced in FIGS. 1-4. Trunk line 15 is depicted in an abbreviated form in FIGS. 2-4 and further is depicted in broken form in FIG. 1 for the purposes of illustration. Trunk line 15 inherently comprises a first line end 16 and a second line end 17 as referenced in FIGS. 2-4; a trunk line length 18 as generally referenced in FIGS. 2 and 3; and at least eight trunk line conductors 19 as further generally referenced in FIGS. 2-4. From an inspection of the noted figures, it will be seen that trunk line conductors 19 extend from first line end 16 to second line end 17 via trunk line length 18.

Preferably, the trunk line conductors 19 comprise numerically-ordered or sequential trunk line conductors, the numerically-ordered trunk line conductors being numbered as first, second, third, fourth, fifth, sixth, seventh, and eighth trunk line conductors. The first trunk line conductor is referenced at 31; The second trunk line conductor is referenced at 32; the third trunk line conductor is referenced at 33; the fourth trunk line conductor is referenced at 34; the fifth trunk line conductor is referenced at 35; the sixth trunk line conductor is referenced at 36; the seventh trunk line conductor is referenced at 37; and the eighth trunk line conductor is referenced at 38, all of which appear in FIG. 4. As earlier indicated, trunk line 15 may preferably comprise at least 8 conductors and thus additional conductors are contemplated. In this regard, a generic additional ninth trunk line conductor has been referenced at 39 in FIG. 4. Preferably, however, it is contemplated that trunk line 15 comprises or is constructed from a Category 5 or Category 6 (CAT 5 or CAT6) cable. Notably, Category 5 cables are commonly used for cross-connecting patch panels and hubs as well as for connecting computers to a wall outlet. Conceivably, Net Optics Enhanced Category 5e Patch Cables featuring high quality 24 awg stranded 4 pair cable terminated with 50 u RJ45 plugs will also perform well in the present application.

Figure 4:
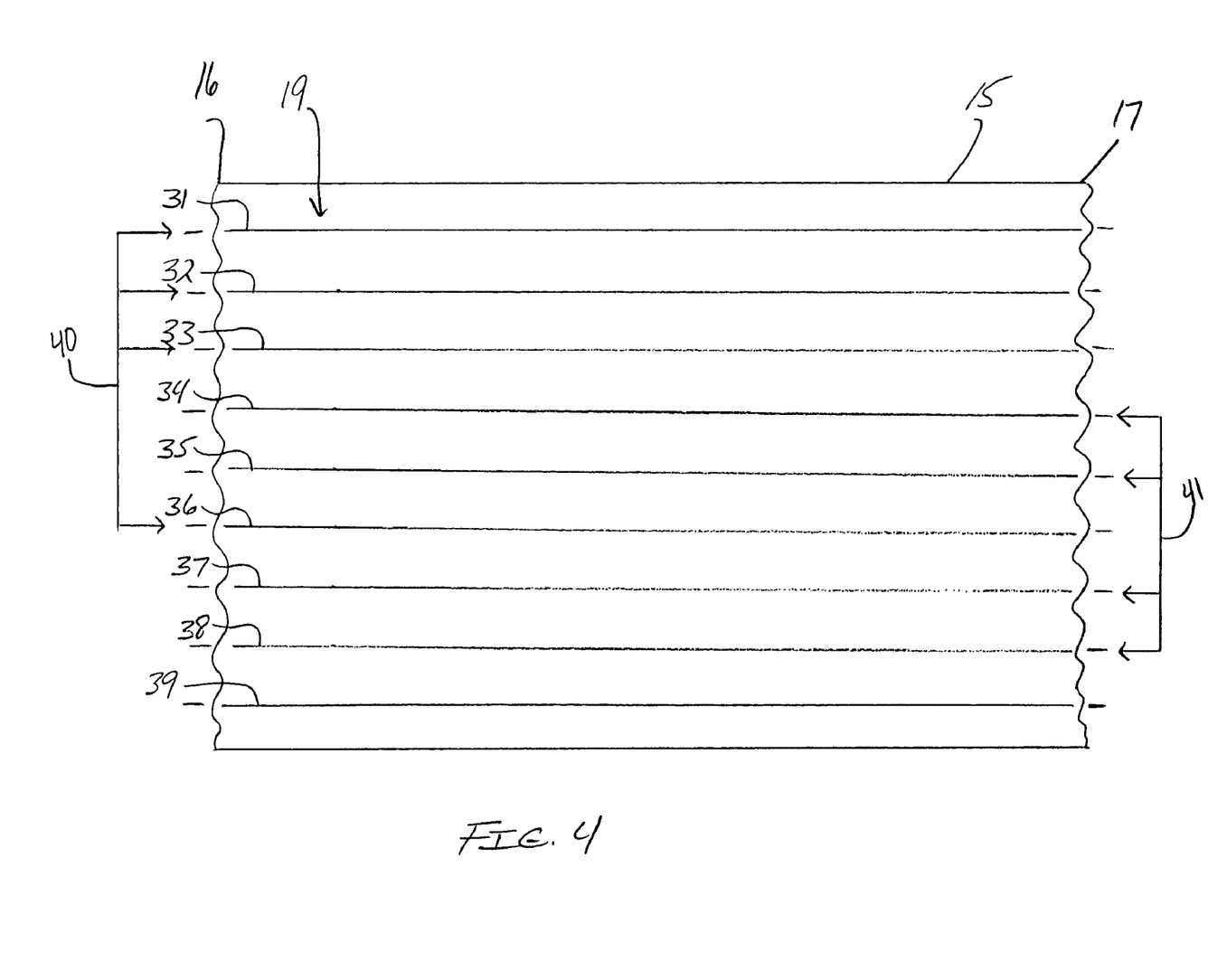
FIG. 4 is a fragmentary depiction of a trunk line showing at least eight trunk line conductors.

The numerically-ordered or sequential trunk line conductors 19 are preferably divided into a first or primary trunk line conductor grouping 40 and a second or secondary trunk line conductor grouping 41 as referenced in FIG. 4. The first trunk line conductor grouping 40 preferably consists of the first, second, third, and sixth trunk line conductors 31, 32, 33, and 36, and the second trunk line conductor grouping 41 preferably consists of the fourth, fifth, seventh, and eighth trunk line conductors 34, 35, 37, and 38. In other words, it is contemplated that the sequential trunk line conductors 19 may preferably be divided into a plurality of line conductor groupings, the line conductor groupings comprising at least one primary line conductor grouping and at least one secondary line conductor grouping. Thus, at least one primary line conductor grouping consists of the first, second, third, and sixth trunk line conductors 31, 32, 33, and 36, respectively, and at least one secondary line conductor grouping consists of fourth, fifth, seventh, and eighth trunk line conductors 34, 35, 37, and 38, respectively.

First and second bankover connectors 13 and 14 each preferably comprise a computer interface 20 as referenced in FIGS. 1-3; a trunk line interface 21 as referenced in FIGS. 1-3; a generic connector casing 22 as referenced in FIGS. 1-3; and at least eight bankover conductors 23 as generally referenced in FIGS. 2 and 3. From an inspection of the noted figures, it will be seen that bankover conductors 23 of bankover connectors 13 and 14 extend from computer interface(s) 20 to trunk line interface(s) 21 via connector casing(s) 22. Each computer interface 20 preferably comprises at least two (or first and second) computer ports 24 as generally referenced in FIGS. 1-3, and each trunk line interface 21 preferably comprises a single trunk line port 25 as referenced in FIGS. 1-3.

Four bankover conductors 23 preferably extend from each first computer port 24 to each trunk line port 25 and four bankover conductors 23 preferably extend from each second computer port 24 to each trunk line port 25 as will be further understood from an inspection of FIGS. 2 and 3. First computer pair 11 and second computer pair 12 each have port communication means 26 or means for linking or communicating the computers of signal-reading machinery with computer ports 24 (as generally referenced in FIG. 1) and message transmittal means 27 or means for sending and receiving messages (electronic information) as generally referenced in FIG. 1.

The port communication means 26 may preferably be defined by comprising numerically or sequentially banked connector (or machine interface) conductors, the numerically banked or sequentially banked connector conductors being numbered as first, second, third, fourth, fifth, sixth, seventh, and eighth connector conductors, as referenced at 1, 2, 3, 4, 5, 6, 7, and 8, respectively, in FIG. 2. The numerically or sequentially banked connector conductors numbered 1-8 are preferably divided into a first bank grouping 43 as generally depicted in darkened arrowheads in FIGS. 2 and 3; and a second bank grouping 44 as generally referenced in darkened circles in FIG. 3. It will be understood from a consideration of the noted figures that the first bank grouping 43 essentially consists of the first, second, third, and sixth connector conductors 1, 2, 3, and 6, respectively; and the second bank grouping 44 essentially consists of the fourth, fifth, seventh, and eighth connector conductors 4, 5, 7, and 8, respectively. The first bank grouping(s) 43 of the first computer pair 11 are electrically communicable with the first trunk line conductor grouping(s) 40 and the first bank grouping(s) 43 of the second computer pair 12 are electrically communicable with the second trunk line conductor grouping(s) 41.

It is thus contemplated that the port communication means 26 may preferably be defined by comprising eight-conductor data cable containing four pairs of wires, each end of which may be outfitted with a registered jack 45 plug or jack (RJ45 jack). It is noted that there are various wiring standards, some standards having different arrangements of colored conductor sheathing. In any event, the basic configuration uses two pairs of wires . . . Pair 1-2 and Pair 3-6. The other four conductors are connected, but typically not used. In some standards, the wires in each active pair cross over. In this last regard, it is further noted that crossover cable functions to connect two and only two computers together. Generally, crossover cables are wired with a T568A RJ45 jack at one end and a T568B RJ45 jack at the other end. The present invention differs from crossover connections in that both ends of linking cable comprise identical RJ45 type jacks. Further, it is contemplated that computer ports 24 and trunk line ports 25 may thus be preferably outfitted with RJ45 type sockets for receiving the RJ45 type jacks or plugs.

The message transmittal means may preferably be defined by certain software or other programming cooperatively associated with certain central processing means in either first computer pair 11 or second computer pair 12. When implemented, certain electrical impulses are transmitted along certain conductive material 45 to the port communication means 26 as generally further referenced in FIG. 1. It is thus further contemplated that the message transmittal means may further include RJ45 type socket(s) for receiving RJ45 type plugs or jacks of the port communication means 26.

The port communication means 26 of the first computer pair 11 are electrically communicable with the first computer ports 24 and the port communication means 26 of second computer pair 12 are electrically communicable with the second computer ports 24. The first line end 16 is electrically communicable with first trunk line port 25 and the second line end 17 is electrically communicable with second trunk line port 25. The port communication means 26, the bankover connectors 13 and 14, and the trunk line 15 enable electrical conductivity intermediate the message transmittal means 27 of computer pairs 11 and 12 and bankover connector system 10 thus enables first and second computer pairs 11 and 12 to electrically communicate via the trunk line 15.

To illustrate how a bankover connection system can be applied, the following example is provided. Step One: Consider an existing trunk line, a CAT5 style containing 8 wires, running from a connection point to a computer. Think of this line coming from a box initiating the computer connection impulses and going to the computer. With no other connections between these two points. Step Two: Disconnect the trunk line at both of these two points thereby stopping communication from the computer to the initiating box. Step Three: Add a bankover connector at each end of the disconnected trunk line. Step Four: Add one RJ45 extension cable from the computer to the bankover connector. Add one RJ45 extension cable from the other bankover connector back to the initiating box. The one existing computer can now communicate again with the box. Step Five: Add one RJ45 extension cable from the initiating box to the bankover connector at the initiating point of the trunk line. Add one RJ45 extension cable from the bankover connector on the side of the existing computer—to any new computer thereby increasing capacity. Effectively, there were two bankover connectors added and four RJ45 extension cables, thereby increasing the computers that use the cable, comprising source signals, to a quantity of two.

It will thus be understood that the bankover connection system of the present invention enables at least two paired machine sets such as first computer pair 11 (primary paired machine set) or second computer pair 12 (secondary paired machine set) to electrically communicate via a single communication or trunk line thus eliminating the need for multiple trunk lines to establish links between paired computers or similar other paired machine sets in electrical communication. The bankover connection system comprises, in combination, at least two paired machine sets, first and second bankover connectors 13 and 14, and trunk line 15. The trunk line 15 essentially comprises first and second line ends 16 and 17; trunk line length 18; and a number of trunk line conductors 19, the number of trunk line conductors 19 preferably being factorable by four. The trunk line conductors 19 extend from the first line end 16 to the second line end 17 via the trunk line length 18.

The first bankover connector 13 essentially comprises a first trunk line interface 21, a first machine interface such as computer interface 20, a first connector casing 22, and at least four first bankover conductors 23. Similarly, the second bankover connector 14 essentially comprises a second trunk line interface 21, a second machine interface such as computer interface 20, a second connector casing 22, and at least four second bankover conductors 23. The first and second bankover conductors extend from the first and second machine interfaces to the first and second trunk line interfaces 21 via the first and second connector casings 22. The first and second machine interfaces each comprise a plurality of machine ports such as computer ports 24, each machine port of first bankover connector 13 being paired with a machine port of the second bankover connector 14.

The first trunk line interface 21 essentially comprises a first trunk line port 25 and the second trunk line interface 21 essentially comprises a second trunk line port 25 substantially as earlier described. The first and second bankover conductors 23 extend from the machine ports to each trunk line port 25. The paired machine sets each have port communication means such as port communication means 26 and message transmittal means such as message transmittal means 27. The port communication means of each machine pair set is electrically communicable with a machine port pairing. The first line end 16 is electrically communicable with the first trunk line port 25 and the second line end 17 is electrically communicable with the second trunk line port 25. Together, the port communication means, the bankover connectors 13 and 14, and the trunk line 15 enable electrical conductivity intermediate the message transmittal means and the bankover connector system thus enables the paired machine sets to electrically communicate via a single trunk line 15.

While the above description contains much specificity, this specificity should not be construed as limitations on the scope of the invention, but rather as an exemplification of the invention. For example, as is described hereinabove, it is contemplated that the present invention essentially provides a bankover connection system or connector assembly for enabling paired machine sets to electrically communicate via a single communication line or a connector assembly for doubling readable partitioned signal output from a single trunk line. The paired machine sets comprise a number of machine pairs, the number of machine pairs being greater than unity. Each paired machine set requires a select conductor configuration for electrical communication, the select conductor configuration being selected from a number of group ed conductors. It is contemplated that the number of grouped conductors are greater than unity so that they may be preferably banked or aligned in side-by-side relation.

The bankover connection system comprises a trunk line and bankover connection means (for example, at least two bankover connectors). The trunk line comprises first and second line ends and a number of trunk line conductors, the number of trunk line conductors being equal to the sum of the number of grouped conductors in each paired machine set. The trunk line conductors extend intermediate the first line end and the second line end. The bankover connection means comprise trunk line interface means (for example, trunk line ports), machine interface means (for example, machine ports or machine port pairings), and a number of bankover conductors. The number of bankover conductors is at least equal to number of trunk line conductors, the bankover conductors extending intermediate the trunk line interface means and the machine interface means.

The machine interface means comprise a number of machine port pairings and the trunk line interface means comprising a trunk line port pairing. The paired machine sets each have port communication means and message transmittal means, the port communication means being electrically communicable with a select machine port pairing. The select machine port pairing is selected from the machine port pairings. The first and second line ends are electrically communicable with the trunk line port pairing. The port communication means, the bankover connection means, and the trunk line enable electrical conductivity intermediate the message transmittal means and the bankover connector system thus enables the paired machine sets to electrically communicate via the trunk line.

Accordingly, although the invention has been described by reference to at least one preferred embodiment, it is not intended that the novel system be limited thereby, but that modifications thereof are intended to be included as falling within the broad scope and spirit of the foregoing disclosure, the following claims and the appended drawings.

I claim:

1. A bankover connection system enabling two paired computer sets to electrically communicate via a single communication line, the bankover connection system comprising, in combination, first and second computer pairs, first and second bankover connectors, and a trunk line, the trunk line comprising first and second line ends, a trunk line length, and at least eight trunk line conductors, the trunk line conductors extending from the first line end to the second line end via the trunk line length, the first and second bankover connectors each comprising a trunk line interface, a computer interface, a connector casing, and at least eight bankover conductors, the bankover conductors extending from the computer interface to the trunk line interface via the connector casing, each computer interface comprising at least two computer ports, each trunk line interface comprising a trunk line port, four bankover conductors extending from each first computer port to each trunk line port and four bankover conductors extending from each second computer port to each trunk line port, the first and second computer pairs each having port communication means and message transmittal means, the port communication means of the first computer pair being electrically communicable with the first computer ports and the port communication means of the second computer pair being electrically communicable with the second computer ports, the first line end being electrically communicable with a first trunk line port, the second line end being electrically communicable with a second trunk line port, the port communication means, the bankover connectors, and the trunk line enabling electrical conductivity intermediate the message transmittal means, the bankover connector system thus enabling the first and second computer pairs to electrically communicate via the trunk line.

2. The bankover connection system of claim 1 wherein the trunk line conductors comprise numerically-ordered trunk line conductors, the numerically-ordered trunk line conductors being minimally numbered as first, second, third, fourth, fifth, sixth, seventh, and eighth trunk line conductors.

3. The bankover connection system of claim 2 wherein the numerically-ordered trunk line conductors are divided into first and second trunk line conductor groupings, the first trunk line conductor grouping consisting of the first, second, third, and sixth trunk line conductors and the second trunk line conductor grouping consisting of the fourth, fifth, seventh, and eighth trunk line conductors.

4. The bankover connection system of claim 3 wherein the port communication means comprise numerically-banked machine interface conductors, the numerically-banked machine interface conductors being numbered as first, second, third, fourth, fifth, sixth, seventh, and eighth connector conductors.

5. The bankover connection system of claim 4 wherein the numerically-banked machine interface conductors are divided into first and second bank groupings, the first bank grouping consisting of the first, second, third, and sixth machine interface conductors and the second bank grouping consisting of the fourth, fifth, seventh, and eighth machine interface conductors.

6. The bankover connection system of claim 5 wherein the first bank grouping of the first computer pair is electrically communicable with the first trunk line conductor grouping and the first bank grouping of the second computer pair is electrically communicable with the second trunk line conductor grouping.

7. A bankover connection system enabling at least two paired machine sets to electrically communicate via a single communication line, the bankover connection system comprising, in combination, at least two paired machine sets, first and second bankover connectors, and a trunk line, the trunk line comprising first and second line ends, a trunk line length, and a number of trunk line conductors, the number of trunk line conductors being factorable by four, the trunk line conductors extending from the first line end to the second line end via the trunk line length, the first bankover connector comprising a first trunk line interface, a first machine interface, a first connector casing, and at least four first bankover conductors, the second bankover connector comprising a second trunk line interface, a second machine interface, a second connector casing, and at least four second bankover conductors, the first and second bankover conductors extending from the first and second machine interfaces to the first and second trunk line interfaces via the first and second connector casings, the first and second machine interfaces each comprising a plurality of machine ports, each machine port being paired, the first trunk line interface comprising a first trunk line port and the second trunk line interface comprising a second trunk line port, the first and second bankover conductors extending from the machine ports to the trunk line ports, the paired machine sets each having port communication means and message transmittal means, the port communication means of each machine pair set being electrically communicable with a machine port pairing, the first line end being electrically communicable with the first trunk line port, the second line end being electrically communicable with the second trunk line port, the port communication means, the bankover connectors, and the trunk line enabling electrical conductivity intermediate the message transmittal means, the bankover connector system thus enabling the paired machine sets to electrically communicate via the trunk line.

8. The bankover connection system of claim 7 wherein the trunk line conductors comprise sequentially-ordered trunk line conductors, the sequentially-ordered trunk line conductors being divided into a plurality of line conductor groupings, the line conductor groupings comprising at least one primary line conductor grouping and at least one secondary line conductor grouping.

9. The bankover connection system of claim 8 wherein at least one primary line conductor grouping consists of first, second, third, and sixth trunk line conductors and at least one secondary line conductor grouping consists of fourth, fifth, seventh, and eighth trunk line conductors.

10. The bankover connection system of claim 9 wherein the port communication means comprise sequentially banked machine interface conductors.

11. The bankover connection system of claim 10 wherein the sequentially banked connector conductors are divided into a plurality of bank groupings, a first bank grouping consisting of first, second, third, and sixth machine interface conductors and a second bank grouping consisting of fourth, fifth, seventh, and eighth machine interface conductors.

12. The bankover connection system of claim 11 wherein the first bank grouping of a primary paired machine set is electrically communicable with the first trunk line conductor grouping and the first bank grouping of a secondary paired machine set is electrically communicable with a secondary trunk line conductor grouping.

13. A bankover connection system enabling paired machine sets to electrically communicate via a single communication line, the paired machine sets comprising a number of machine pairs, the number of machine pairs being greater than unity, each paired machine set requiring a select conductor configuration for electrical communication, the select conductor configuration being selected from a number of grouped conductors, the number of grouped conductors being greater than unity, the bankover connection system comprising a trunk line and bankover connection means, the trunk line comprising first and second line ends and a number of trunk line conductors, the number of trunk line conductors being equal to the sum of the number of grouped conductors in each paired machine set, the trunk line conductors extending intermediate the first and second line ends, the bankover connection means comprising trunk line interface means, machine interface means, and a number of bankover conductors, the number of bankover conductors being at least equal to number of trunk line conductors, the bankover conductors extending intermediate the trunk line interface means and the machine interface means, the machine interface means comprising a number of machine port pairings, the trunk line interface means comprising a trunk line port pairing, the paired machine sets each having port communication means and message transmittal means, the port communication means being electrically communicable with a select machine port pairing, the select machine port pairing being selected from the machine port pairings, the first and second line ends being electrically communicable with the trunk line port pairing, the port communication means, the bankover connection means, and the trunk line enabling electrical conductivity intermediate the message transmittal means, the bankover connector system thus enabling the paired machine sets to electrically communicate via the trunk line.

14. The bankover connection system of claim 13 wherein the trunk line conductors comprise sequentially-ordered trunk line conductors, the sequentially-ordered trunk line conductors being divided into a number of line conductor groupings, the line conductor groupings comprising at least one primary line conductor grouping and at least one secondary line conductor grouping.

15. The bankover connection system of claim 14 wherein the port communication means comprise sequentially banked connector conductors.

16. The bankover connection system of claim 15 wherein the sequentially banked connector conductors are divided into a number of bank groupings, the number of bank groupings being no greater than the number of machine port pairings.

17. The bankover connection system of claim 16 wherein the bank groupings comprise at least one primary bank grouping and at least one secondary bank grouping.

18. The bankover connection system of claim 17 wherein the primary bank grouping of a first select paired machine set is electrically communicable with the primary line conductor grouping and the primary bank grouping of at least one second select paired machine set is electrically communicable with a secondary trunk line conductor grouping.

19. The bankover connection system of claim 18 wherein the primary line conductor grouping consists of first, second, third, and sixth trunk line conductors and at least one secondary trunk line conductor grouping consists of fourth, fifth, seventh, and eighth trunk line conductors.

20. The bankover connection system of claim 19 wherein the primary bank grouping consists of first, second, third, and sixth connector conductors and at least one secondary bank grouping consists of fourth, fifth, seventh, and eighth connector conductors.

21. A bankover connector for enabling maximized readable signal output from a trunk line, the trunk line comprising a plurality of trunk line conductors, the trunk line conductors being divided into a number of line conductor groupings, the line conductor groupings comprising at least one primary line conductor grouping and at least one secondary line conductor grouping, each line conductor grouping carrying a select readable signal, the bankover connector comprising trunk line interface means, machine interface means, and a number of bankover conductors, the number of bankover conductors being at least equal to number of trunk line conductors, the machine interface means comprising a number of machine ports, the bankover conductors extending intermediate the trunk line interface means and the machine ports, the machine ports being electrically communicable with a number of signal-reading machines, the select readable signals being electrically communicable with the trunk line interface means, the bankover conductors, the machine ports, and the signal-reading machines, the bankover connector thus enabling maximized readable signal output from the trunk line.

22. The bankover connector of claim 21 wherein the bankover conductors are divided into a plurality of connector groupings, the connector groupings comprising at least one primary connector grouping and at least one secondary connector grouping, the primary connector grouping being electrically communicable with the primary line conductor grouping and the secondary connector grouping being electrically communicable with the secondary trunk line conductor grouping.

23. The bankover connector of claim 22 being usable in combination with the signal-reading machines, the signal-reading machines comprising port communication means, the port communication means comprising sequential connector conductors, the sequential connector conductors being divided into a number of bank groupings, the number of bank groupings being no greater than the number of machine port pairings, the number of bank groupings comprising at least one primary bank grouping and at least one secondary bank grouping, the primary bank grouping of a first select signal-reading machine being electrically communicable with the primary line conductor grouping via the primary connector grouping, and the primary bank grouping of at least one second select signal-reading machine being electrically communicable with a secondary trunk line conductor grouping via the secondary connector grouping.

* * * * *